US007333589B2

(12) United States Patent
Ellenbogen et al.

(10) Patent No.: US 7,333,589 B2
(45) Date of Patent: *Feb. 19, 2008

(54) SYSTEM AND METHOD FOR CT SCANNING OF BAGGAGE

(75) Inventors: Michael Ellenbogen, Wayland, MA (US); Richard Robehr Biijani, Cambridge, MA (US)

(73) Assignee: Reveal Imaging Technologies, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/417,692

(22) Filed: May 3, 2006

(65) Prior Publication Data

US 2006/0198495 A1   Sep. 7, 2006

Related U.S. Application Data

(63) Continuation of application No. 10/763,695, filed on Jan. 23, 2004, now Pat. No. 7,046,761.

(60) Provisional application No. 60/442,246, filed on Jan. 23, 2003.

(51) Int. Cl.
*G01N 23/083* (2006.01)
(52) U.S. Cl. ...................................... 378/57
(58) Field of Classification Search .................. 378/57, 378/58, 131
See application file for complete search history.

(56) References Cited

U.S. PATENT DOCUMENTS

| 4,247,774 A | 1/1981 | Brooks | 250/367 |
|---|---|---|---|
| 4,315,157 A | 2/1982 | Barnes | 250/445 T |
| 5,182,764 A * | 1/1993 | Peschmann et al. | 378/57 |
| 5,367,552 A * | 11/1994 | Peschmann | 378/57 |
| 5,570,403 A | 10/1996 | Yamazaki et al. | 378/5 |
| 5,583,903 A | 12/1996 | Saito et al. | 378/19 |
| 5,661,774 A | 8/1997 | Gordon et al. | 378/101 |
| 5,673,300 A * | 9/1997 | Reckwerdt et al. | 378/65 |
| 5,692,029 A | 11/1997 | Husseiny et al. | 378/88 |
| 5,818,897 A * | 10/1998 | Gordon | 378/19 |
| 6,094,467 A * | 7/2000 | Gayer et al. | 378/4 |
| 6,185,272 B1 | 2/2001 | Hiraoglu et al. | 378/57 |
| 6,218,943 B1 | 4/2001 | Ellenborgen | 340/572.4 |
| 6,385,286 B1 * | 5/2002 | Fitchard et al. | 378/65 |
| 6,421,552 B1 | 7/2002 | Hsieh | 600/425 |
| 6,944,264 B2 | 9/2005 | Bijjani et al. | 378/57 |
| 7,046,761 B2 * | 5/2006 | Ellenbogen et al. | 378/57 |

(Continued)

FOREIGN PATENT DOCUMENTS

EP   0 471 455 A2   2/1992

(Continued)

*Primary Examiner*—Allen C. Ho
(74) *Attorney, Agent, or Firm*—Mintz, Levin, Cohn, Ferris, Glovsky and Popeo P.C.

(57) ABSTRACT

The threat determination process for CT scan of baggage eliminates the need for complete reconstruction the bag. The CT scan data is analyzed during scanning to locate potential threats. The analysis is based upon a lineogram representing objects in the bag. The mass, size, location and atomic number of objects are determined based upon the lineogram data. Any potential threats are further subjected to data modification and reconstruction to enhance the view of the potential threat. Dual energy scanning may also be used to determine density for resolution of potential threats.

14 Claims, 10 Drawing Sheets

U.S. PATENT DOCUMENTS

2002/0176531 A1    11/2002   McClelland et al. .......... 378/57

FOREIGN PATENT DOCUMENTS

| | | |
|---|---|---|
| EP | 0 816 873 A1 | 1/1998 |
| EP | 0 825 457 A2 | 2/1998 |
| WO | WO 96/13839 | 5/1996 |
| WO | WO 97/18462 | 5/1997 |
| WO | WO 03/029844 A2 | 4/2003 |

* cited by examiner

High Clutter
Low Clutter

SYSTEM AND METHOD FOR CT SCANNING OF BAGGAGE

This application is a continuation of U.S. Nonprovisional Application Ser. No. 10/763,695, filed Jan. 23, 2004, now U.S. Pat. No. 7,046,761 B2, which claims the benefit of U.S. Provisional Application Ser. No. 60/442,246, filed Jan. 23, 2003.

BACKGROUND OF THE INVENTION

1. Field of the Invention

The present invention relates to a Computed Tomography (CT) system for inspecting baggage for explosives or other contraband. More particularly, it relates to a Computed Tomography (CT) scanning process which does not require complete reconstruction.

2. Discussion of Related Art

Following the terrorist attacks on Sep. 11, 2001, the United States government decided to implement additional airport security. One of the security measures which were to be implemented was inspection of all checked baggage for explosives. In November 2001, Congress passed the Aviation and Transportation Security Act, which mandated 100% explosive detection screening of checked baggage by Dec. 31, 2002. It was expected that the screening requirements would be met through a combination of Explosive Detection Systems (EDS) and Explosive Trace Detection systems (ETD). EDS is faster, but more expensive and more prone to false alarms. ETD is much slower, more invasive and requires more manual input. Congress later extended the deadline for fully deployed until Dec. 21, 2003, on a case by case basis, as long as approved interim methods, such as canine teams, hand searches and passenger bag matching, were employed.

Implementation of this security measure using existing technology has been and will continue to be cumbersome and expensive. Even by the end of 2003, the implemented solutions are unlikely to be permanent solutions. In many cases, airports have deployed hand-fed machines in terminal lobbies, usurping premium space, or implemented the manpower-intensive ETD systems. In order to improve efficiency, reduce manpower requirements, and recover lobby space, airports will transition to EDS machines integrated into airport baggage handling system. However, existing EDS machines are not easily deployed or integrated into existing baggage handling systems. Known Explosives Detection Systems (EDS) utilize either computed Tomography (CT) technology, or a combination of x-ray and CT technology, to create an image of the contents of a bag. Projection x-ray systems have been used for many years with carry-on baggage. However, such systems require operator review of all images and slow throughput. Furthermore, these systems also cannot provide thickness or density information for objects in order to provide explosive detection.

A Computed Tomography (CT) machine has been designed to perform automated explosives detection for passenger baggage, parcels, mail, and small cargo prior to loading onto an aircraft. CT technology has been proven to successfully meet the US TSA Certification requirements for automated explosives detection (EDS) in airline checked baggage. While CT technology is effective for explosive detection, use of existing CT technology in checked baggage inspection has many drawbacks. CT machines incorporate a rotating ring or "gantry" on which the X-ray source and detectors are mounted. FIG. 1 is a cross sectional view of a conventional CT scanner 10. The CT scanner 10 includes a gantry 11 surrounding a tunnel 20. A conveyor (not shown) moves baggage through the tunnel 20 for scanning. The gantry 11 rotates about the tunnel, producing one slice of data for each rotation. An x-ray source 30 produces an narrow angle beam 40. A detector 31 is positioned on the gantry 11 to intersect the x-ray beam 40 passing through the tunnel. The detector 31 may consist of multiple detectors which are located equal distances from the x-ray source. The x-ray source 30 and detector 31 must be sized and positioned so that the entire tunnel falls within the x-ray beam. The data from the detector is analyzed using a computer to generate a three-dimensional representation of the contents of the baggage being scanned.

These CT based systems have many drawbacks. They are large, heavy and require substantial space. The tunnel 20 has to be large enough to accommodate substantially all sizes of checked baggage. The x-source 30 and detector 31 must be positioned sufficient distant from the tunnel 20 so that the entire tunnel is within the x-ray beam 40. Furthermore, the gantry 11 has to be large enough to accommodate the entire detector 31, positioned equidistant from the source. The x-ray source 30 also must be powerful enough to provide sufficient flux at the detector 31, after passing through the baggage, to overcome noise and allow for analysis. The gantry 11 also must be sturdy enough to support and balance the large x-ray source for high-speed rotation. In typical CT systems, the gantry 11 is 5/3 to 2 times the size of the tunnel 20. Furthermore, the system requires significant shielding, generally lead, to protect the operators and passengers from accidental exposure to the powerful x-rays.

The CT scanning and reconstruction process used for baggage inspection is slow and cumbersome. There are two known methods for CT scanning, helical and start/stop. In helical scanning, the object is continuously moved through the scanner. The bag has to be moved slowly so that each rotation of the gantry is substantially in a single plane. In start/stop scanning, the bag is periodically stopped and a single slice is scanned. The bag is then moved a short distance, stopped and scanned again. Both of these processes result in slow movement of baggage through the scanner. Once the data has been collected, the data is reconstructed to create a three dimensional representation of the baggage. From the three dimensional representation, individual items are reviewed as possible threats. The three dimensional representation, or slices of it, may also be displayed for review by an operator.

The operation of CT scanning was originally developed and improved in connection with medical imaging. With medical imaging, resolution is very important. Thus, systems seek to improve the ability to reconstruct images with lots of data, generally with respect to small portions of a body. Scanning speed is less important than accuracy. Additionally, all of the parts of the body need to be analyzed to determine minor differences which can indicate problems. These processes are not readily applicable to baggage scanning. Explosives or other threats are significantly larger than the microscopic items relevant to medical imaging. Furthermore, most objects in a bag are irrelevant to the inspection. However, in prior art system, all objects must be reconstructed prior to the analysis. Baggage inspection systems have addressed these difficulties principally by conducting additional inspections, such as with a flat x-ray, to locate general areas of interest in a bag for CT scanning. Nevertheless, these systems require multiple scanners or multiple passes of baggage through a scanner, which further slows the process.

SUMMARY OF THE INVENTION

The deficiencies of the prior art are substantially overcome by the CT system and method of the present invention which conducts an analysis of the unreconstructed scanning data to locate potential threats. With the CT scan of the present invention, objects in a bag appear in the scanned data as sinusoidal representations of similar density or atomic number. The sinusoidal representations are analyzed to determine potential threats based upon data representing mass, size, atomic number and density. The size is estimated from the width and length of the sinusoidal representation of the object. According to another aspect of the invention, the density, mass or atomic number of an object is determined based upon a small portion of the data related to that object. The small portion of the object may be selected to avoid clutter or shielding from other objects.

According to another aspect of the invention, the system adjusts for noise, inconsistencies and baggage movement. In the data representation, theoretically objects would appear as perfect sine waves. Real scans, however, have various inconsistencies. These inconsistencies may be the result of inherent inaccuracies in assumptions or upon unanticipated movement. The system of the present invention corrects for inconsistencies. A center of gravity line is determined for each object based upon the data at each location. The data points for the line are then adjusted so that the center of gravity line is a true sine wave. The density and size of the object are determined from the adjusted data.

According to another embodiment of the invention, a partial image reconstruction of the CT data is created. The CT image is reconstructed around a target area of the image based upon the information obtained from analysis of the sine wave data. The CT image may be reconstructed based upon the original data or upon data adjusted to approach an ideal sine wave. Furthermore, the target area may be determined based upon an analysis of various sine waves of objects in order to avoid clutter or shielding.

According to another aspect of the invention, baggage is analyzed while it is being scanned. When a potential threat is determined, the rate of the conveyor is slowed or stopped to allow additional data collection for enhanced analysis. Once the object has been properly analyzed, the conveyor may return to normal speed.

DETAILED DESCRIPTION

Figure 1:
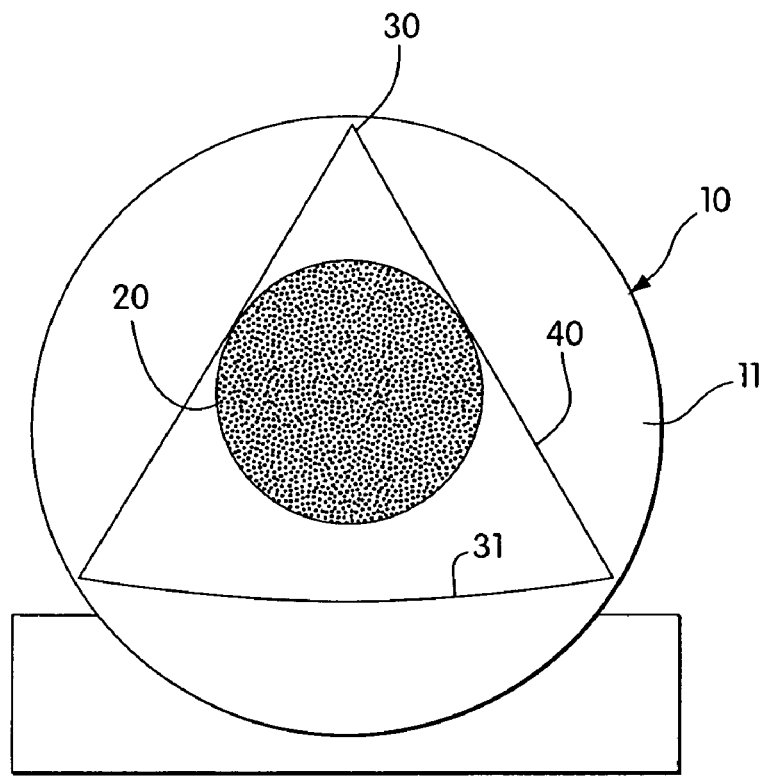
FIG. 1 is a cross sectional view of a conventional CT scanner which can be used with the processing system of the present invention.
Figure 2:
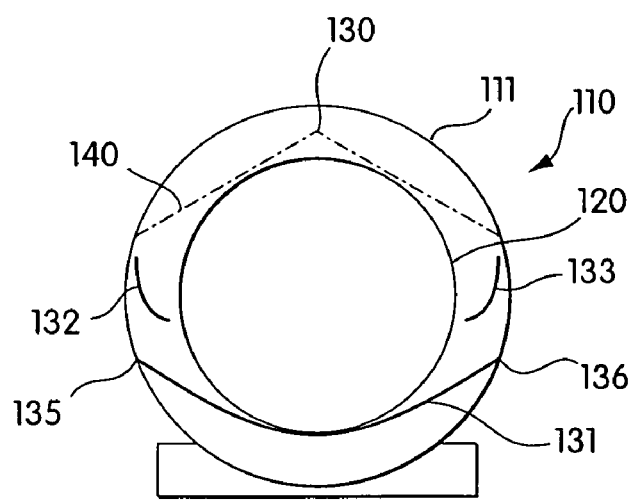
FIG. 2 is a cross sectional view of a folded array CT scanner which can be used with the processing system of the present invention.

The present invention relates to a system and method for processing CT data to locate potential threats. The CT data may be obtained from a CT scanner of any known design. For example, the CT data may be obtained from a CT scanner of the prior art as shown in FIG. 1 and discussed above. Alternatively, the assignee of the present invention has devised a novel CT scanner having a reduced size, as set forth in the patent application entitled "Folded Array CT Baggage Scanner," filed on even date herewith. FIG. 2 illustrates the positioning of a wide angle x-ray source 130 and detectors 131, 132, 133 on the ring 111 of a gantry 110 according to an embodiment of the folded array CT scanner. The ring 111 of the gantry 110 is substantially smaller than for conventional CT scanners with a similar size tunnel 120. The wide angle x-ray source 130 is located on the gantry 110 so that the x-ray beam intersects the entire area of the tunnel 120. Since the x-ray source 130 has a wider beam 140 than for a conventional CT scanner, it can be positioned closer to the tunnel. The CT scanner of the present invention includes two or more sets of detectors 131, 132, 133 at different distances from the x-ray source 130. One set of detectors 131 covers a central portion of the gantry ring and is centered on the x-ray source at a distance equal to the source to center detector distance. The other sets of detectors 132, 133 are positioned to intersect the outer ranges of the x-ray fan beam 140. According to an embodiment of the invention, the second sets of detectors 132, 133 start at the points 135, 136 in the beam 140 where the inner detectors 131 reach the edge of the ring 111.

Figure 3:
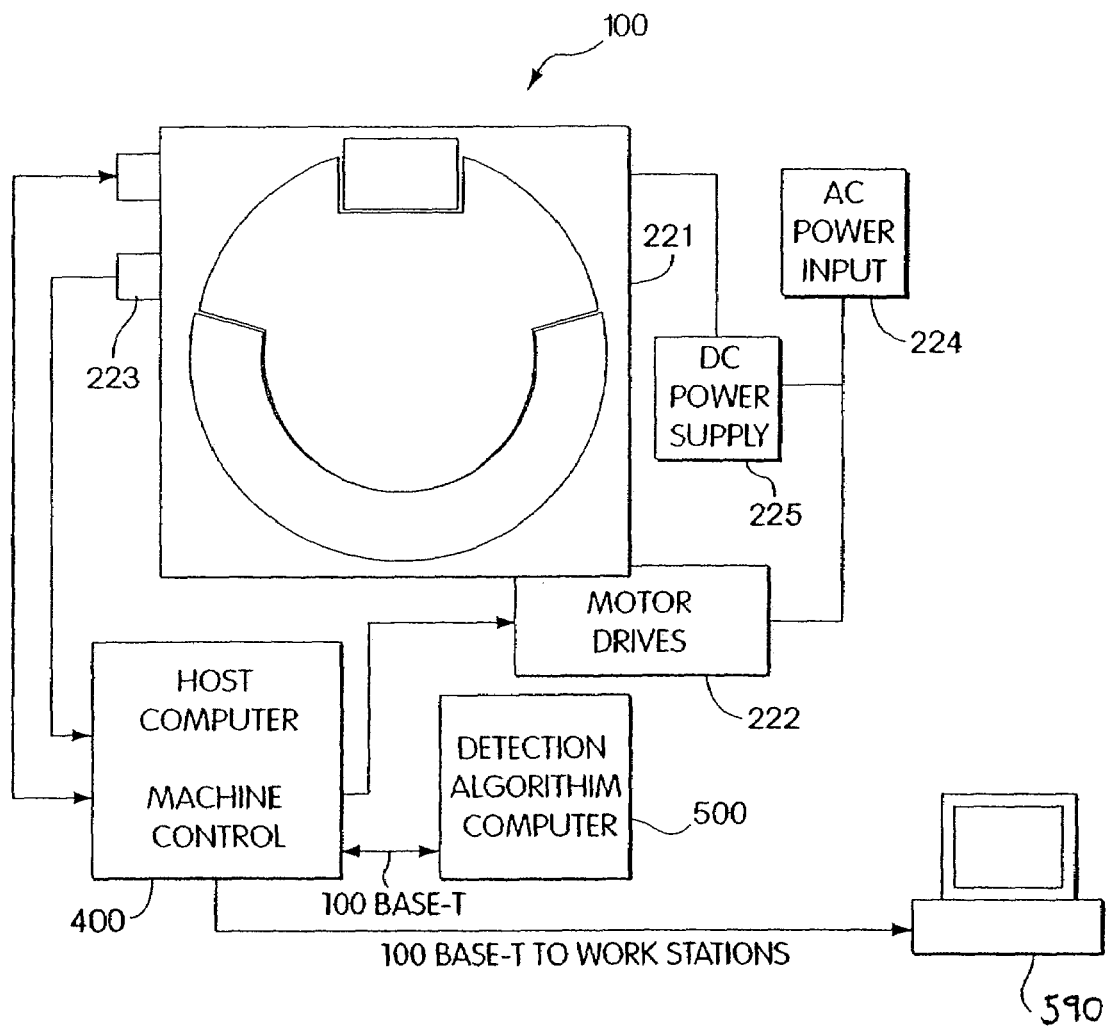
FIG. 3 is a block diagram of the components of a CT scanner according to an embodiment of the present invention.

FIG. 3 illustrates the components of a CT scanner 100 according to an embodiment of the present invention. The CT scanner 100 includes the gantry 221, and two computers 400, 500. The host computer 400 controls operation of the scanner and retrieves data from the detectors. The detection algorithm computer 500 operates on the data to determine whether an explosive device or other object of interest is present. Of course, a single computer could be used to perform all of the functions for the CT scanner. However, the use of two computers prevents the extensive processing of the detection algorithm from slowing down the operation and data collection of the CT scanner. Also, control and data elements are connected between the gantry 221 and the computers 400, 500. An ac power input 224, connected to ordinary 240 V AC power, provides the power for the CT scanner. A DC power supply 225 receives the AC power and converts it to DC power for powering the processing elements on the gantry. A set of motor drives 222, powered by the AC power, or alternatively by the DC power, operate the conveyor and rotate the gantry. A data link 223 connects the detector assemblies to the host computer 400 that is connected by a 100 BASE-T to workstation 590. DC power and the data link are positioned on the ring of the gantry to provide data during rotation. Circuit boards on the detector assemblies sample the detectors 1440 times per second. The data is then transferred, through the data link 223 to the host computer 400. Encoders are also used to determine the rotational position of the gantry and of the conveyor. This data is also provided to the host computer.

Figure 4:
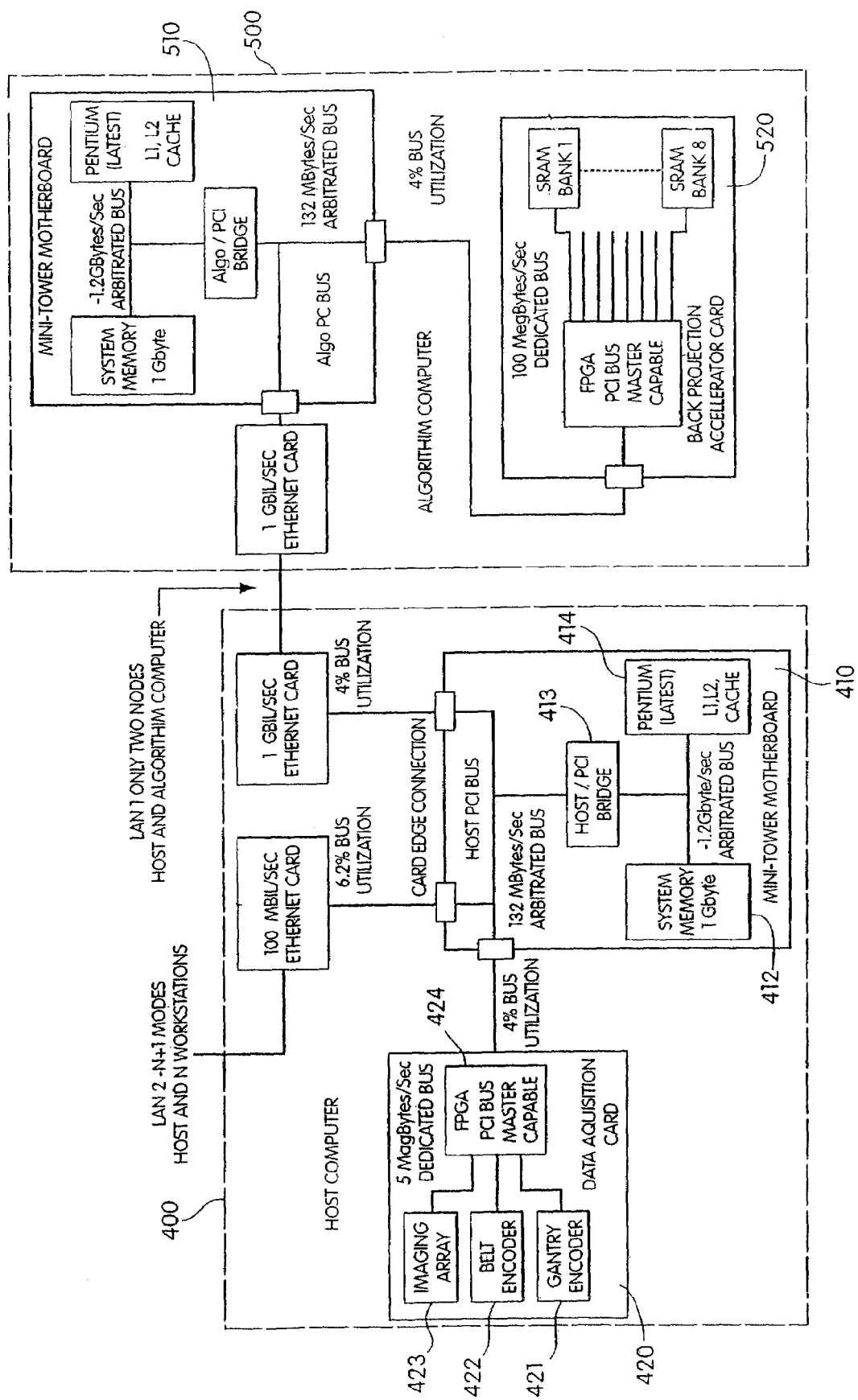
FIG. 4 is a block diagram of computer components of a CT scanner according to an embodiment of the present invention.

The components of the computers 400, 500 are illustrated in FIG. 4. The host computer 400 includes a motherboard 410 and a data acquisition card 420. The data acquisition card 420 includes inputs from the imaging array 423, the conveyor belt encoder 422, and the gantry encoder. 421. It also includes a field programmable gate array card 424 for retrieving the data and forwarding it to the motherboard 410. The motherboard 410 includes a processor 414, such as a Pentium processor from Intel, and a large RAM 412. It also includes a Host/PCI bridge 413 for sending and receiving information from the data acquisition card and other computers. The data retrieved from the CT scanner is transferred to the detection algorithm computer 500. An ethernet connection allows quick transfer of the large amounts of data. The detection algorithm computer also includes a motherboard 510 for proper processing of the data and a backprojection accelerator card 520 for processing the data to determine the existence of explosives or other materials.

According to an embodiment of the invention, the detection algorithm computer 500 is programmed to process the data from the CT scanner in a manner which allows a determination of the nature of contents of interest without a complete reconstruction of the entire contents. This method allows baggage to be scanned and processed at a faster rate than with conventional CT processing. The bag is scanned while it is moving on the conveyor belt and the gantry is rotating. The data is analyzed in such a way as to take advantage of the fact that there are projection images at every angle. The method allows for the automated finding in three dimensions of all the objects in the bag and the clutter around them. It is done at such a speed (5-10 cm of belt motion for every revolution) as to render the data extremely unreadable as a traditional projection data, and too sparse to be used for helical scanning. The advantages are that this mode of data acquisition will allow the belt to move at a constant speed (like a helical scanner) but requires significantly fewer detectors and computer processing power.

In the method of the present invention, the data is analyzed from all 360 degrees and a suitable angle (per object in the bag) is selected to analyze the properties of the particular object. A better estimate (than Single Projection) for mass is achieved because the x, y and z position of the object in the bag are known. The length can be deduced by simple edge following techniques and the high/low energy image ratio (if dual energy is used) could be used to determine the atomic number without a lot of expensive basis space and background subtraction complex algorithms.

Figure 5:
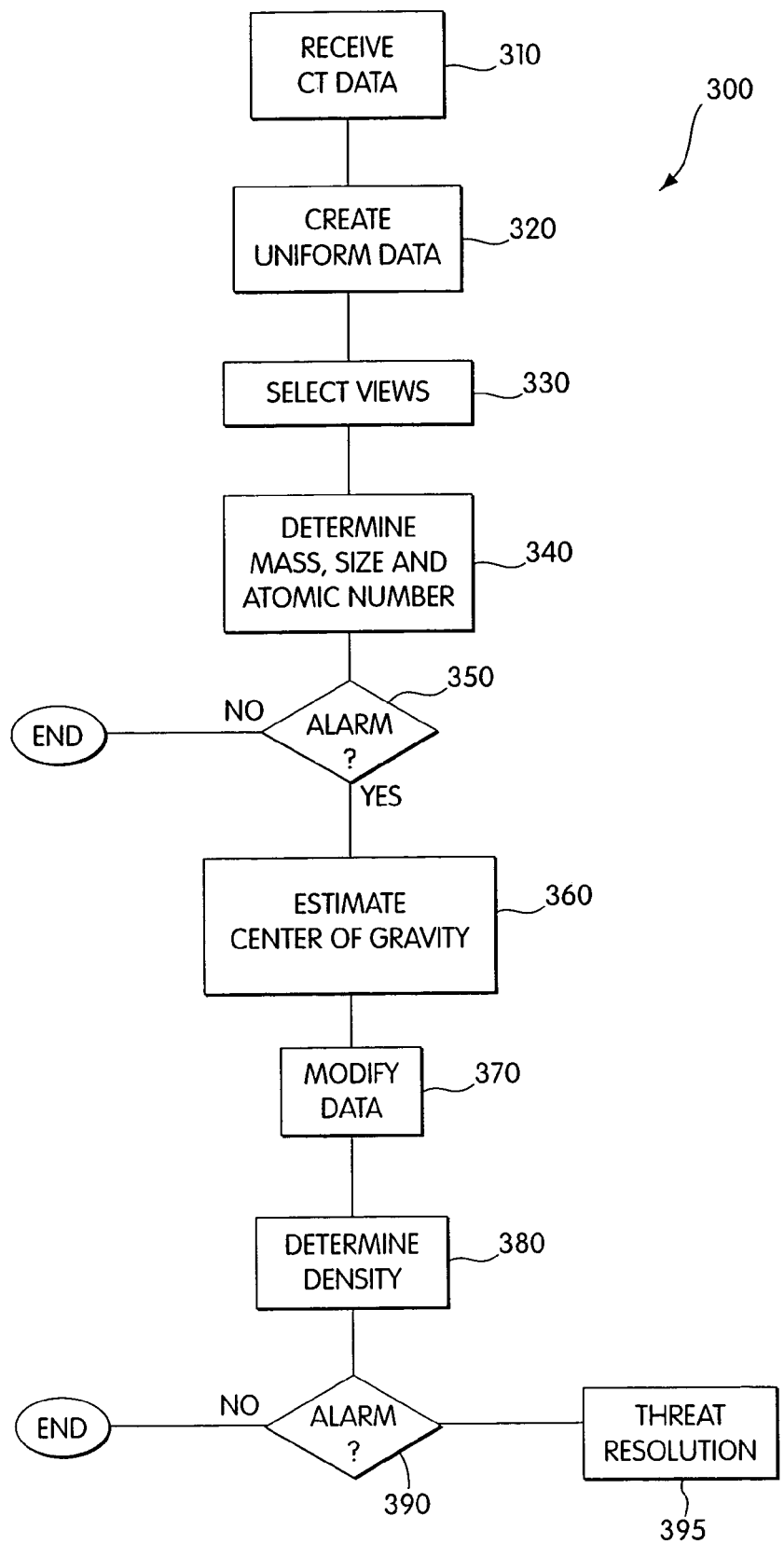
FIG. 5 is a block flow diagram of a CT data analysis process according to an embodiment of the present invention.
Figure 6A:
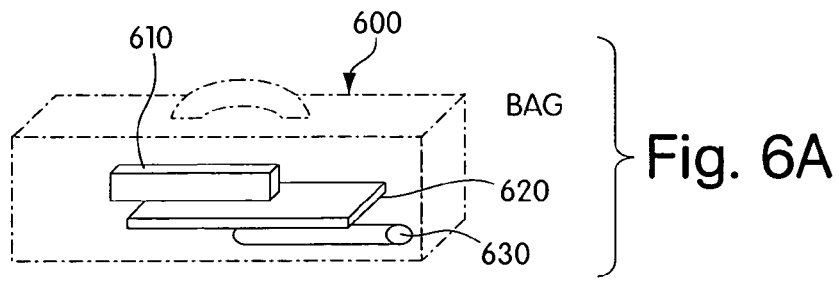
FIGS. 6A-6D illustrate a detection process according to an embodiment of the present invention.
Figure 6B:
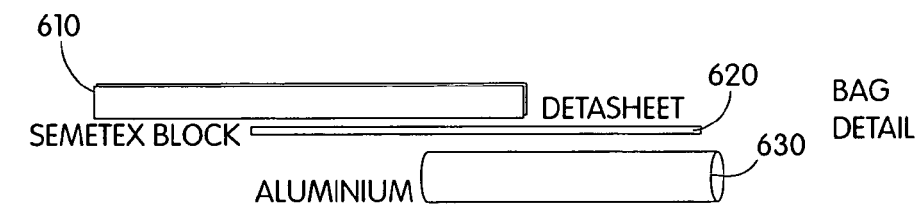

FIG. 5 is a block flow diagram of a process 300 for analyzing the CT scanner data according to an embodiment of the present invention. FIGS. 6A-6D illustrate the processing of the data according to an embodiment of the present invention. FIG. 6A represents a bag 600 to be scanned. Three objects of interest are shown in the bag, a Semtex block 610, a data sheet 620 and a aluminum rod 630. FIG. 6B illustrates a side view including detail of the objects as they correspond to the scanned data shown in FIG. 6C.

Figure 6C:

As a bag is scanned, the CT scanner generates a large quantity of data. The present invention operates with large quantities of data generated by a rapidly moving CT scanner. According to an embodiment of the invention, the gantry rotates at a rate of 60 to 90 RPM and the conveyor belt is moved at 5-10 cm/s. The detector array is sampled at a constant rate of 1440 lines per second. The data is received, at step 310, by the detection algorithm computer 500 from the CT scanner 221 and host computer 400. FIG. 6C is a lineogram representing the CT scanner data for objects in the bag. The lineogram represents the raw data obtained from the scanner which has been processed solely to obtain uniform data, at step 320. Each line of raw data represents the values at the detectors at a sample time. Since the x-ray source is substantially a point, each detector provides data from a different angle. The raw data is processed so that each horizontal position in the lineogram represents a single horizontal position in the bag and angular projection. The present invention uses known techniques for processing of CT scanner data to create the uniform lineogram data. However, the data is not reconstructed to obtain three-dimensional voxels of the entire contents of the bag. Rather the uniform data is left as a lineogram. Furthermore, while FIG. 6C illustrates the lineogram data as it could be displayed on a monitor, the system does not necessarily display any such data. The data is merely processed in the detection algorithm computer 500. However, FIG. 6C, and other figures representing lineograms, are presented to indicate how the data is processed.

Figure 6D:

As illustrated in FIG. 6C, each object appears as a substantially sinusoidal line in the lineogram. The horizontal dimension in the data, FIG. 6C, corresponds to the horizontal position within the bag. The vertical dimension represents a z dimension, i.e., the position of the object from the x-ray source. The vertical dimension changes for the object as the angles change during rotation. The detection algorithm computer 500, processes the data to analyze each object represented by a sinusoidal line. FIG. 6D illustrates a detail area of the image in FIG. 6C. The detail shows where the data 610a, 620a, 630a from various objects overlap and areas where objects are separated.

Figure 7A:
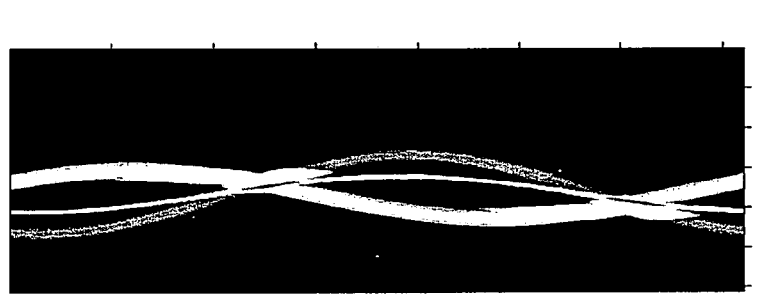
FIG. 7A-7B illustrate determination of clutter from scanned data.
Figure 7B:
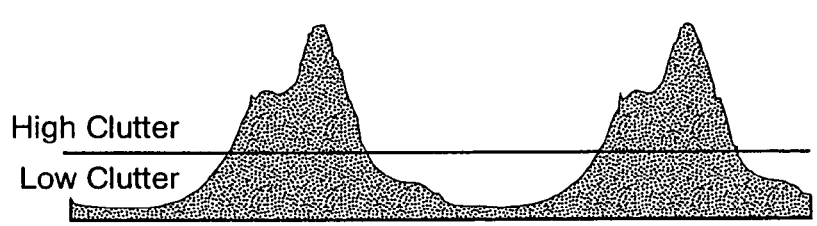

According to the present invention, each object is analyzed separately to determine whether or not it might be a threat. For a proper analysis, the objects in the bag must be separated. At step 330, one or more views of an object are selected so that objects are separable from the clutter around them, i.e. other objects. The mass or attenuation of each line is calculated during the scanning process. A clutter index is then calculated for each slice of the data. The slice in this context is not the same as a "slice" of reconstructed CT data. In conventional systems, the voxels for the entire bag are reconstructed. Since all of the voxels are known, a "slice" can be created at any angle representing the voxels in the plane of the slice. Additionally, a single rotation of the gantry in a start/stop CT scanner is also called a slice. With respect to the present invention, the clutter index is based upon a "slice" of data, which is a vertical line through the lineogram and corresponds to a single horizontal position in the bag and single projection angle. The clutter index represents how evenly the mass is distributed along the width of the bag for a given projection angle. A high clutter index represents areas where objects likely overlap. A low clutter index identifies projection angles where the objects are most likely separated and where their properties can be more accurately calculated. FIGS. 7A-7B illustrate a determination object clutter which can be used to select views for analysis of the CT data. FIG. 7A is a lineogram for a bag and FIG. 7B is the corresponding clutter index. A threshold value is used to determine areas of high clutter and areas of low clutter.

Figure 8A:
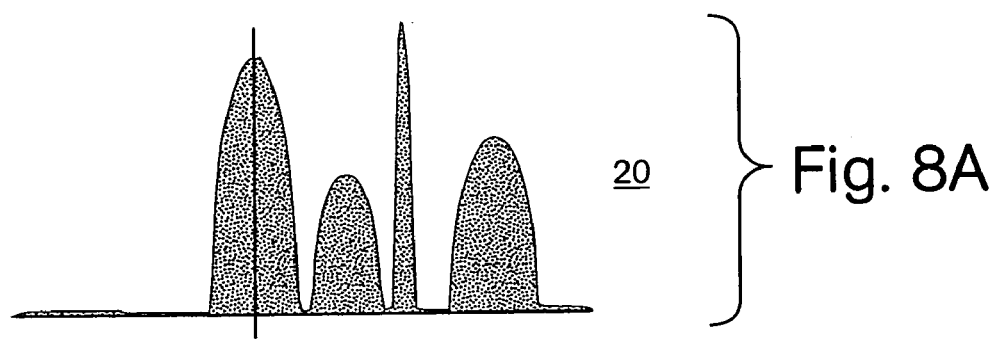
FIGS. 8A-8C illustrate object data from different angles in a low clutter area.
Figure 8B:
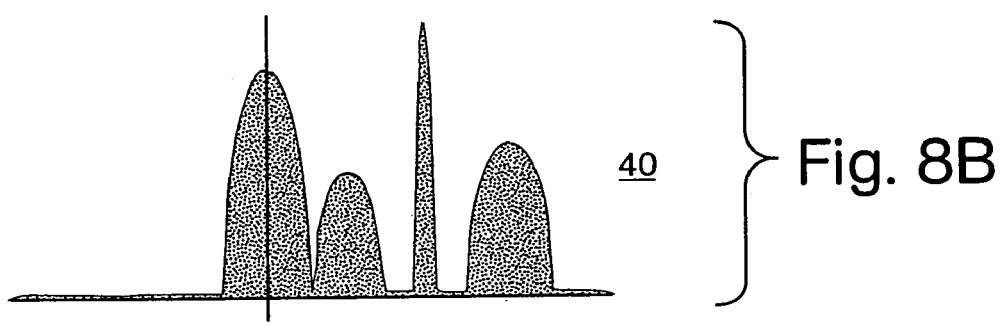
Figure 8C:
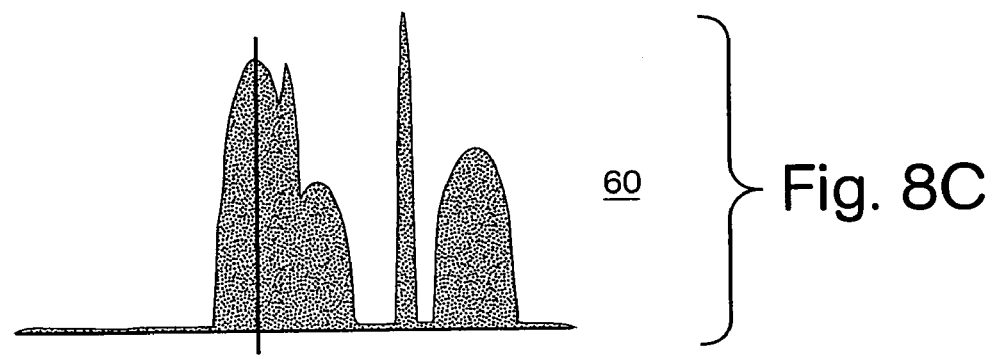
Figure 9:
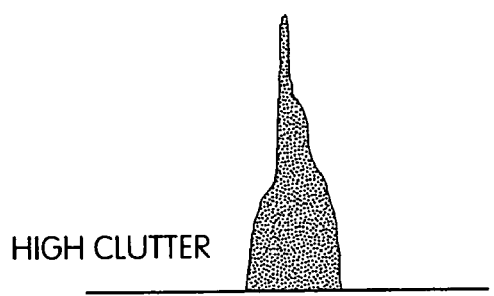
FIG. 9 illustrates object data in a high clutter area.

The data at the low clutter areas are analyzed to determine objects of interest. FIGS. 8A-8C illustrate data from three angles, 20, 40 and 60 degrees in the low clutter area. The data shows several distinct objects. FIG. 9 illustrates the same object data at a high clutter angle, in which the objects cannot be distinguished.

At the low clutter views selected at step 330, the objects are analyzed, at step 340, to determine mass, size, metallic content, location, Z-eff, and atomic number for each object. Two views are required to determine the mass of the object. An object located in one view is compared to objects in a second view to find a closest match. Additional views can be used to increase the reliability of the system. If an object cannot be reliably located in multiple views, then the bag should be noted for further review and possible hand search. The use of multiple views allows a determination of the x,y position of the object in the bag. The exact position allows calculation of the magnification of the object, its dimensions, and, hence, the mass per unit length of the object. The length of the object can be determined from the length of the lineogram corresponding to that object. The determined information is compared to preselected criteria to determine whether an object is a potential threat. Since objects are located and analyzed based upon slices of the bag, processing can occur simultaneously with the scanning process and does not have to wait until all data is collected.

If no potential threats are located in the initial analysis, the bag is cleared, at step 350 and continues onward in the baggage handling system. However, if any potential threats are identified, the analysis continues at step 360. Furthermore, the analysis commencing with step 360 does not have to await complete scanning of the bag. At any time during the processing, an object can be identified as a potential threat and subjected to further analysis. In this manner, the processing of a bag is expedited. The processing at step 360 seeks to locate and analyze a single object. An object which is perfectly positioned parallel to the axis of rotation of the gantry would create a true sine wave. However, objects generally have other orientations. The first step in the secondary analysis process is to determine and correct for the path of the object.

Figure 10A:
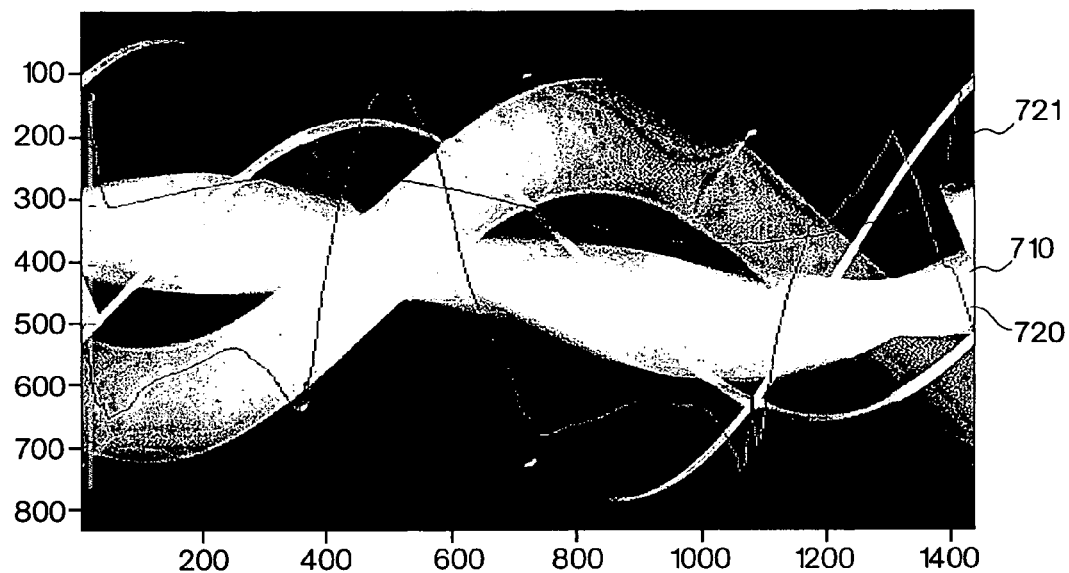
FIGS. 10A and 10B illustrate a data modification process according to an embodiment of the present invention.

At step 360, the center of gravity of the object of interest is estimated. To locate the center of gravity, two points along the object of interest are located. These points are located at areas of low clutter and a the center of gravity of the object of interest along the particular slice. The center of gravity of the correct object is more easily determined at the areas of low clutter because other objects are not contributing to the data at such locations. FIG. 10A is a lineogram having an object of interest 710. The mass clutter indexes 720, 721 are superimposed on the lineogram to illustrate areas of low clutter. The center of gravity line of the object of interest can be estimate based upon the two points.

Figure 10B:
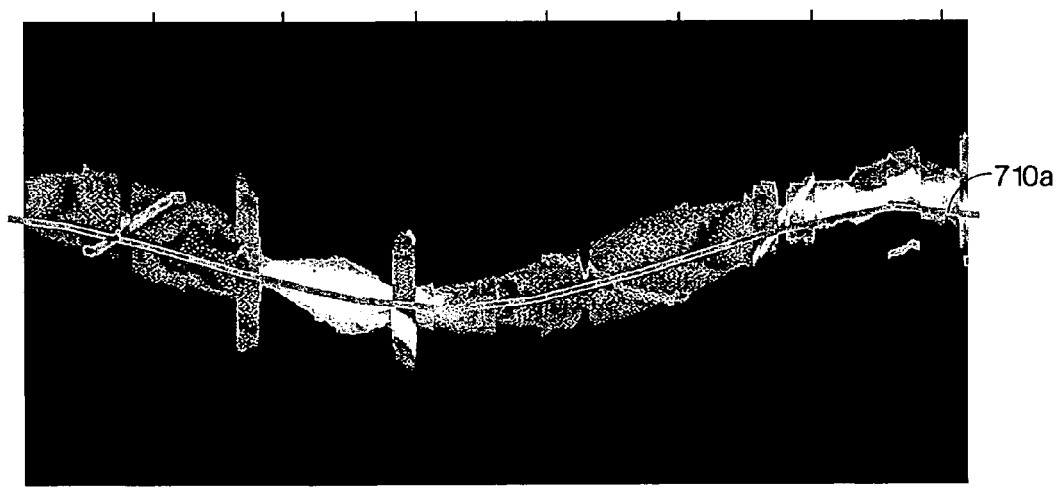

At step 370, the object data is modified so that the object projections are on a desired sine wave. The sine wave is selected to pass through one of the two selected points. The object data in modified by eliminating all other objects and moving the projections of the object of interest from the center of gravity line to the selected sineogram. FIG. 10B illustrates the modified data 710a for the object of interest 710 of FIG. 10A. The modified data is used to reconstruct the object of interest. All other data is ignored. Since only a small portion of the data is used in the reconstruction, the process can be accomplished quickly. Furthermore, the reconstruction is clearer since it is limited to the object of interest.

Figure 11A:
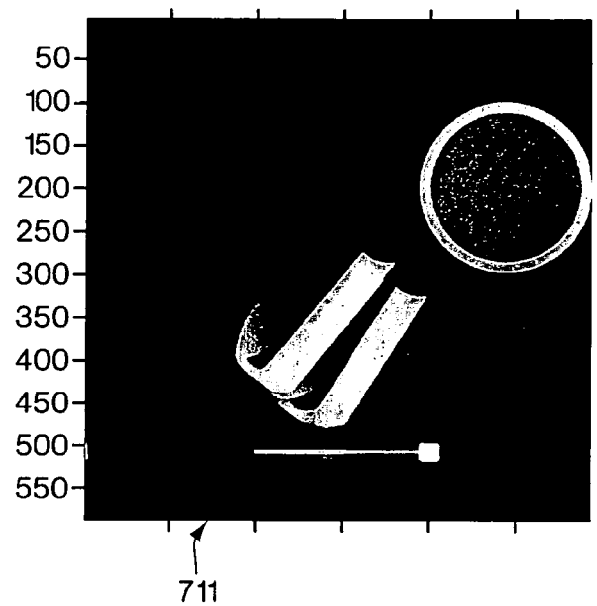
FIGS. 11A-11C illustrate reconstruction of data subjected to the modification process of the present invention.
Figure 11B:
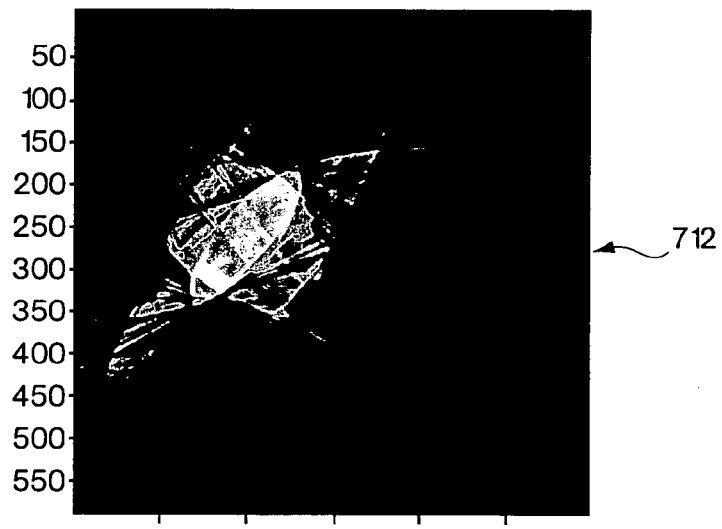
Figure 11C:
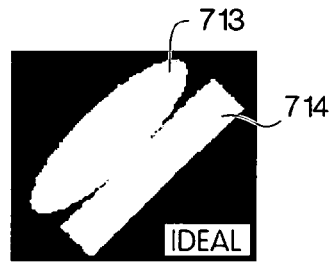

FIGS. 11A-11C illustrate the effect of data modification on reconstruction. FIG. 11A represents a reconstructed image using the original data. The object of interest 711 is unclear within the confusion of other objects. FIG. 11B illustrates the reconstruction from the modified data. The objection of interest 712 is clearly focused and visible. FIG. 11C illustrates the actual contents of the bag in which an explosive material 713 is adjacent to a thick piece of metal 714.

From the reconstructed data, the density of the object can be determined step 380. Again, at step 390, a determination is made as to whether a potential threat exists. If not threat exists, the bag is cleared. Otherwise, other resolution mechanisms are used at step 395.

Figure 12:
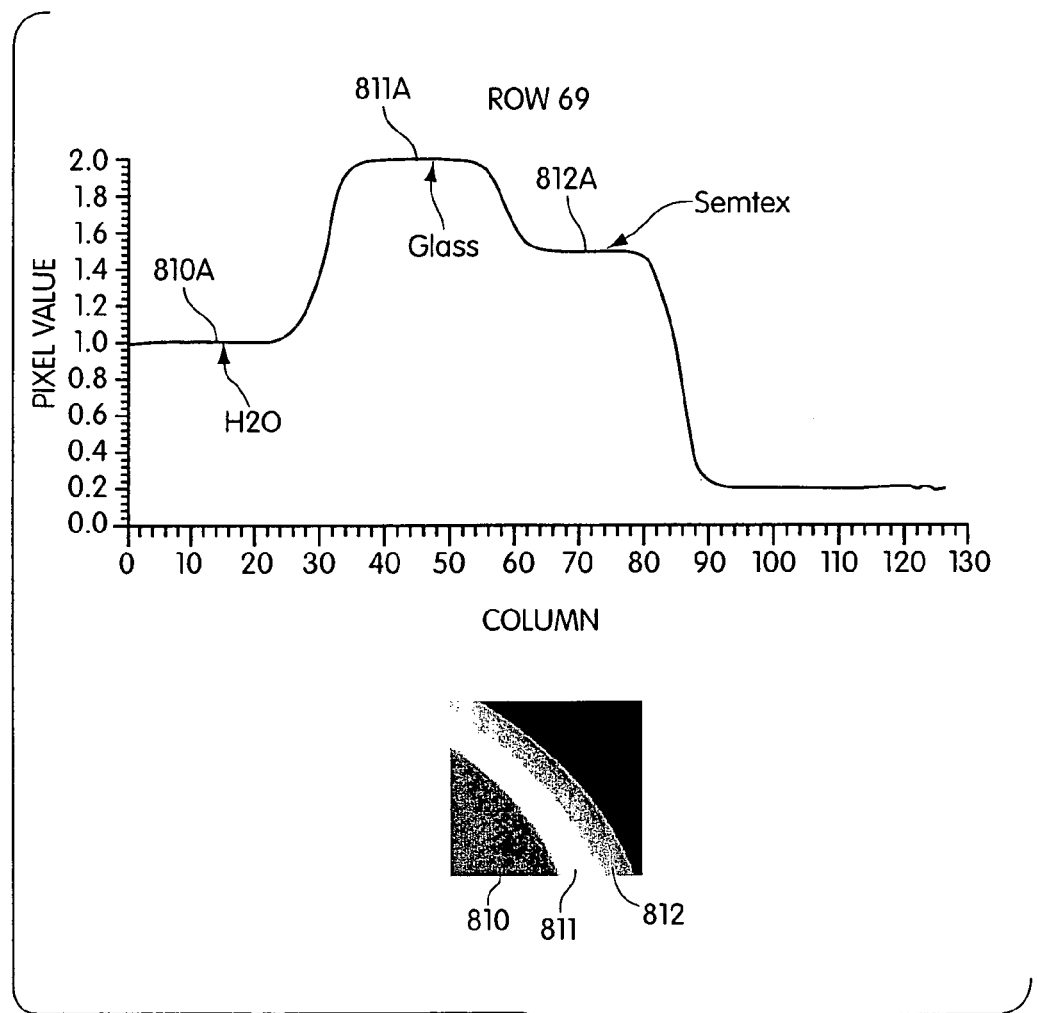
FIG. 12 illustrates reconstruction of data at an area of interest in a bag.

Other resolution mechanisms may include review of a reconstructed image by an operator, additional scans of the object of interest, or hand search. If operator review is required, the relevant CT image is reconstructed from the scanned data in an known manner. The reconstructed data is presented in visual form to the operator, along with an indication of the area on concern. The operator may then clear or stop the bag. Alternatively, the bag can be returned to the CT scanner and a high resolution, dual energy scan performed. Since the location of the object of interest, in x, y, and z, is known from the previous processing, the entire slice of scan need not be reconstructed. FIG. 12 illustrates reconstruction of a 2 cm square of the image at an area of interest. The dual energy scan and high resolution allows detection of an ultra-thin sheet of explosive 812, 812A around a glass bottle 811, 811A of water 810, 810A.

The analysis of the present invention aids in review of bags and can be performed rapidly. The system of the present invention can be used as a level 1 machine, running at roughly 300 to 360 bags per hour (10-12 seconds/bag), through the first alarm stage. A lineogram image is analyzed for explosives in 10-12 seconds. Of course, the throughput could be increased by running the belt faster and rotating the gantry faster. If the bag is cleared the bag is sent on its way to the airplane, if not, the machine can automatically take more slices using dual energy higher resolution CT of the alarming objects (typically 1 or 2 per alarming bag). It is estimated that the algorithm will be able to clear 50 to 75% of these alarms, with an additional 15-20 seconds of analysis. The remaining alarms are sent to a workstation, where an operator looks at the images and decides whether to clear or otherwise rescan the bag, open it or 'sniff' it.

According to another embodiment of the invention ¼ detector shift techniques can be used reconstruct higher resolution CT images for the slices where the lineogram analysis alarmed. The CT capability can be treated as a level 2 mode for alarm resolution and also for finding ultra thin sheet explosives that are not currently detectable with existing technologies, but which present a known threat to aviation security.

Since analysis of a bag proceeds simultaneously with scanning, an alarm can be addressed while the bag is still in the scanner. If analysis of the data indicates a potential threat which cannot be resolved through data modification and reconstruction, the bag can be immediately subjected to a high resolution scan. This can be done by slowing down the gantry or the conveyor belt. A high resolution image can be created and presented to an operator for review. If the gantry is slowed to about 10 RPM and the bag moves at a high speed of about 1.5 m/sec, an high resolution line projection image can be obtained and presented to the operator with an overlay of the threat position. Alternatively, if the conveyor belt is slowed to about 1 cm/sec, a full 3D image of the bag using standard helical CT algorithms can be generated and presented to the operator.

Having described at least one embodiment of the invention, modifications, adaptations and improvements will be readily apparent to those of ordinary skill in the art. Such modification, changes and adaptations are considered part of the invention.

The invention claimed is:

1. A method for determining a position of a first object in a package of multiple objects, the method comprising:
  processing a CT scan of the package to produce a lineogram;
  determining clutter indexes for slices in the lineogram, wherein each slice corresponds to a single horizontal position in the package and a single projection angle;
  selecting a clutter index from the clutter indexes and a corresponding horizontal position; and
  outputting an indicia of the position of the first object in the package.

2. The method of claim 1, wherein the selecting the includes:
  comparing the clutter index for each slice with a predetermined threshold value; and
  selecting a clutter index with a value that is less than the predetermined threshold value.

3. The method of claim 1 further comprising:
  determining a center of gravity of the first object;
  determining a sine wave through the center of gravity of the first object modifying data in the lineogram such that data relating to the first object based upon the sine wave;
  reconstructing voxels relating to an area of the package about the first object using the modified data.

4. A method for scanning a bag to locate potential threats comprising the steps of:
  performing a CT scan of the bag;
  calculating a lineogram from the CT scan of the bag;
  determining a clutter index for positions in the lineogram;
  selecting positions in the lineogram wherein the clutter index is less than a threshold value;
  determining a characteristic of objects from data at the selected positions;
  determining whether a threat exists based upon the characteristics of the objects; and
  outputting an indicia of the existence of a threat.

5. The method of claim 4, wherein the selecting includes determining a mass for each position in the lineogram.

6. The method of claim 4 further comprising the steps of:
  determining a center of gravity of a first object having a characteristic of a threat;
  determining a sine wave through the center of gravity of the first object modifying data in the lineogram such that data relating to the first object based upon the sine wave;
  reconstructing voxels relating to an area of the package about the first object using the modified data; and
  determining whether a threat exists based upon the reconstructed voxels.

7. The method of claim 6 further comprising the step of presenting an image of the reconstructed voxels to an operator for review.

8. The method of claim 4 wherein the step of determining whether a threat exists occurs simultaneously with the CT scan of the bag.

9. The method of claim 8, further comprising the step of changing the CT scan of the bag when a threat is determined.

10. The method of claim 9, wherein the step of changing the CT scan of the bag includes reducing a speed of the bag passing through the CT scan.

11. The method of claim 9, wherein the step of changing the CT scan of the bag includes increasing the resolution of the CT scan.

12. A system for locating threats in bags comprising:
  a CT scanner having a rotating gantry;
  a conveyor for advancing bags through the CT scanner during rotation of the gantry;
  means for creating a lineogram of data from the CT scanner;
  means for determining a clutter index for positions in the lineogram;
  means for selecting a clutter index with a value that is less than a threshold value;
  means for determining at least one characteristic of objects in a bag based upon data at the positions; and
  means for determining threats based upon the at least one characteristic.

13. The system of claim 12, further comprising
  a drive mechanism for driving the conveyor a predetermined speed; and
  means for changing the predetermined speed of the drive mechanism upon determination of a threat.

14. The system of claim 12 further comprising:
  means for changing the resolution of data from the CT scanner upon determination of a threat.

* * * * *

UNITED STATES PATENT AND TRADEMARK OFFICE
CERTIFICATE OF CORRECTION

PATENT NO. : 7,333,589 B2 Page 1 of 1
APPLICATION NO. : 11/417692
DATED : February 19, 2008
INVENTOR(S) : Michael Ellenbogen et al.

It is certified that error appears in the above-identified patent and that said Letters Patent is hereby corrected as shown below:

On the title page item 76 "Richard Robehr Biijani" should read --Richard Robehr Bijjani--

Column 9, Lines 16 and 17 should read --The method of claim 1, wherein the selecting includes:--

Signed and Sealed this

Seventeenth Day of June, 2008

JON W. DUDAS
*Director of the United States Patent and Trademark Office*